United States Patent
Cho

(10) Patent No.: US 12,393,534 B2
(45) Date of Patent: Aug. 19, 2025

(54) SHARED SLAVE ACCESS CONTROLLER, ELECTRONIC DEVICE HAVING THE SAME, AND OPERATING METHOD THEREOF

(71) Applicant: SAMSUNG ELECTRONICS CO., LTD., Suwon-si (KR)

(72) Inventor: Dongsik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/389,008

(22) Filed: Nov. 13, 2023

(65) Prior Publication Data

US 2024/0403246 A1 Dec. 5, 2024

(30) Foreign Application Priority Data

May 30, 2023 (KR) ........................ 10-2023-0069109

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC .............................. G06F 13/20; G06F 2213/40
See application file for complete search history.

(56) References Cited

U.S. PATENT DOCUMENTS

| 7,623,828 B2 | 11/2009 | Block et al. |
| 11,392,517 B2 | 7/2022 | Tanaka |
| 2003/0221030 A1 | 11/2003 | Pontius et al. |
| 2005/0027920 A1 | 2/2005 | Fitzsimmons et al. |
| 2006/0149875 A1 | 7/2006 | Dong et al. |
| 2016/0124851 A1 | 5/2016 | Cho |
| 2018/0157611 A1 | 6/2018 | Sengoku |
| 2019/0132304 A1* | 5/2019 | Overby ............... H04L 63/0853 |
| 2021/0360412 A1* | 11/2021 | Chakraborty ......... H04W 72/21 |

FOREIGN PATENT DOCUMENTS

| CN | 111031035 A | * 4/2020 | ......... G06F 21/6227 |
| KR | 10-2016-0052938 A | 5/2016 | |
| WO | WO-2015010653 A1 | * 1/2015 | ............ H04W 16/10 |

OTHER PUBLICATIONS

English translation of CN-111031035-A (Year: 2020).*
English translation of WO-2015010653-A1 (Year: 2015).*

* cited by examiner

*Primary Examiner* — Henry Tsai
*Assistant Examiner* — John B Roche
(74) *Attorney, Agent, or Firm* — Sughrue Mion, PLLC

(57) ABSTRACT

An electronic device is provided. The electronic device includes: a plurality of master devices; and a shared subsystem including: a system bus connected to the plurality of master devices; a shared slave device; and a shared slave access controller connected to the system bus, and configured to determine a master identification number corresponding to an access request received from a first master device of the plurality of master devices, determine whether or not to permit the first master device to access the shared slave device during an access window of the shared slave device based on the master identification number, and control access authority of the first master device during the access window.

20 Claims, 14 Drawing Sheets

|     | Master5 | Master4 | Master3 | Master2 | Master1 | Master0 |
|-----|---------|---------|---------|---------|---------|---------|
| AW0 |         |         |         |         |         | y       |
| AW1 |         |         |         | y       |         | y       |
| AW2 |         |         | y       | y       | y       | y       |
| AW3 |         |         |         | y       | y       |         |
| AW4 |         |         |         | y       |         |         |
| AW5 |         |         |         |         |         |         |
| AW6 |         |         |         |         |         |         |
| AW7 |         |         |         |         |         |         |

FIG. 7A

|      | Master5 | Master4 | Master3 | Master2 | Master1 | Master0 |
|------|---------|---------|---------|---------|---------|---------|
| AW0  | y       | y       |         |         |         |         |
| AW1  |         | y       | y       | y       | y       | y       |
| AW2  |         |         | y       | y       | y       | y       |
| AW3  |         |         |         | y       |         |         |
| AW4  |         | y       | y       | y       | y       |         |
| AW5  |         |         |         |         |         |         |
| AW6  |         |         |         |         |         |         |
| AW7  |         |         |         |         |         |         |

FIG. 7B

SHARED SLAVE ACCESS CONTROLLER, ELECTRONIC DEVICE HAVING THE SAME, AND OPERATING METHOD THEREOF

CROSS-REFERENCE TO RELATED APPLICATION(S)

This application claims priority to Korean Patent Application No. 10-2023-0069109 filed on May 30, 2023, in the Korean Intellectual Property Office, the disclosure of which is incorporated herein by reference for in its entirety.

BACKGROUND

The present disclosure relates to a shared slave access controller, an electronic device having the same, and an operating method thereof.

A memory system may be implemented as a single product/chip including two or more subsystems. For example, the memory system may be implemented as a single product/chip including two or more of an application processing system, a communication system, a navigation system, a voice recognition system, a context hub system, and an audio system. Each of the subsystems may operate based on at least one processor. For example, the memory system may include two or more processors.

SUMMARY

Example embodiments provide a shared slave access controller which provides active access control and debugging of a shared device, an electronic device having the same, and a method of operating the same.

According to an aspect of an example embodiment, an electronic device includes: a plurality of master devices; and a shared subsystem including: a system bus connected to the plurality of master devices; a shared slave device; and a shared slave access controller connected to the system bus, and configured to determine a master identification number corresponding to an access request received from a first master device of the plurality of master devices, determine whether or not to permit the first master device to access the shared slave device during an access window of the shared slave device based on the master identification number, and control access authority of the first master device during the access window.

According to an aspect of an example embodiment, an electronic device includes: a plurality of master devices; a system bus connected to the plurality of master devices; a shared slave access controller connected to the system bus; and a plurality of shared slave devices connected to the shared slave access controller. The shared slave access controller is configured to determine a master identification number corresponding to an access request received from a first master device of the plurality of master devices, determine whether to permit the first master device to access a first shared slave device of the plurality of shared slave devices during an access window of the first shared slave device based on the master identification number, and control an access authority of the first master device during the access window.

According to an aspect of an example embodiment, a method of operating a shared slave access controller, the method includes: determining whether an identification number of an access request received from a master device is a predetermined master identification number; determining whether an access window corresponding to an address of the access request is a predetermined access window based on the identification number of the access request being the predetermined master identification number; determining an authority for the master device during the access window based on the access window being the predetermined access window; and permitting the master device to access a shared slave device based on the authority for the access window of the master device being allowed.

According to an aspect of an example embodiment, a shared slave access controller includes: an access monitor circuit connected to a system bus, and configured to determine a master identification number of a access request received from a first master device of a plurality of master devices, determine access to a shared slave device based on the master identification number, determine whether an access window of the shared slave device is present using an address of the access request based on access to the shared slave device being allowed, and determine an authority for the access window based on the access window being present; an address checker circuit configured to output the address of the access request to the shared slave device based on the authority for the access window; and a register set configured to store information indicating whether each of the plurality of master devices has access to the shared slave device and access rights of the plurality of master devices for respective access windows of the shared slave device.

According to an aspect of an example embodiment, a method of operating a shared slave access controller, the method includes: checking whether a master request received from a master device includes a master identification number; and controlling master access and master authority for a shared slave device based on the master request including the master identification number.

BRIEF DESCRIPTION OF DRAWINGS

The above and other aspects, features, and advantages will be more clearly understood from the following detailed description, taken in conjunction with the accompanying drawings, in which:

FIGS. 7A and 7B are diagrams illustrating that access rights are differently assigned to access windows AW0 to AW7 of a plurality of respective masters 0 to 5 according to example embodiments;

DETAILED DESCRIPTION

Hereinafter, example embodiments will be described with reference to the accompanying drawings. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A shared slave access controller according to an example embodiment, along with an electronic device including the shared slave access controller, and its method of operation, allow for setting and controlling access range and authority of masters for the shared slave device. The shared slave access controller may include logic for distinguishing access masters, an access checker based on the master, and address handler logic. Example embodiments enable collective control of access rights for each access master for the slave device shared by multiple masters. Example embodiments distinguish masters through authority settings and collectively control access IDs (identification numbers) to facilitate access control based on the characteristics of each access range of the shared slave device. The access ID may include the physical port number of the master connected to the system bus.

Figure 1:
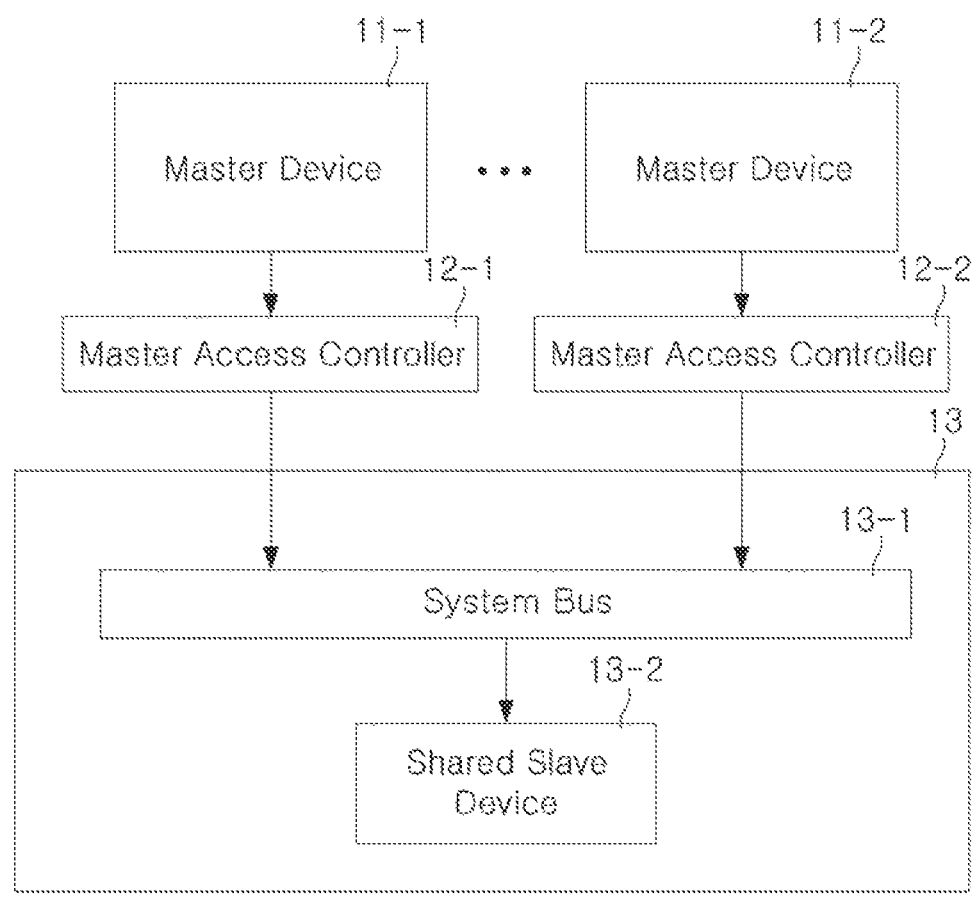
FIG. 1 is a diagram illustrating an electronic device 10.

FIG. 1 is a diagram illustrating an electronic device 10. Referring to FIG. 1, an electronic device 10 includes a plurality of master devices 11-1 and 11-2, a plurality of corresponding master access controllers 12-1 and 12-2, and a shared subsystem 13. The shared subsystem 13 includes a shared slave device 13-2 connected to a system bus 13-1.

The shared slave device 13-2 may grant different access permissions to each master within the address space. Additionally, the shared slave device 13-2 may redistribute access permissions within the address space by modifying access permissions for each master over time. The access permissions granted to each master device can be either read or write permissions. Depending on the characteristics of each master device, such as whether it is a secure master or a non-secure master, or whether it has special privileges or non-privileged access, access permissions may vary. These access permissions based on the type of access or the characteristics of the master may also be subject to temporal constraints. For example, certain access permissions may only be allowed for a single write operation, or permissions may change when a specific trigger signal is activated, necessitating various access permissions to be granted spatially or temporally within the address space.

In the electronic device 10, the range and authority of access are set for each master device individually. This method of setting access range and authority at each individual master's location not only affects one shared slave device but also affects all slave devices accessed by the corresponding master device. Because each master device is located in an independent system, these authorization settings can be carried out by accessing the address space of each corresponding independent system. Generally, for each individual master device, read/write permissions for specific address spaces can be configured. However, due to the distributed access window, access settings for all master devices located in independent systems for the address space of the shared slave device 13-2 cannot be changed simultaneously in a timely manner. Consequently, the electronic device 10 cannot set access permissions for the shared slave device 13-2 based on the access characteristics of the master.

As electronic devices are designed to operate independently, the number of subsystems working independently within a single product is increasing, and shared slave devices are growing as resources are shared to reduce costs. In this scenario, these independent subsystems interact with each other in complex ways, often leading to unintended effects and malfunctions in the product. Debugging becomes challenging as the independent operations make it difficult to identify the root cause of issues.

Figure 2:
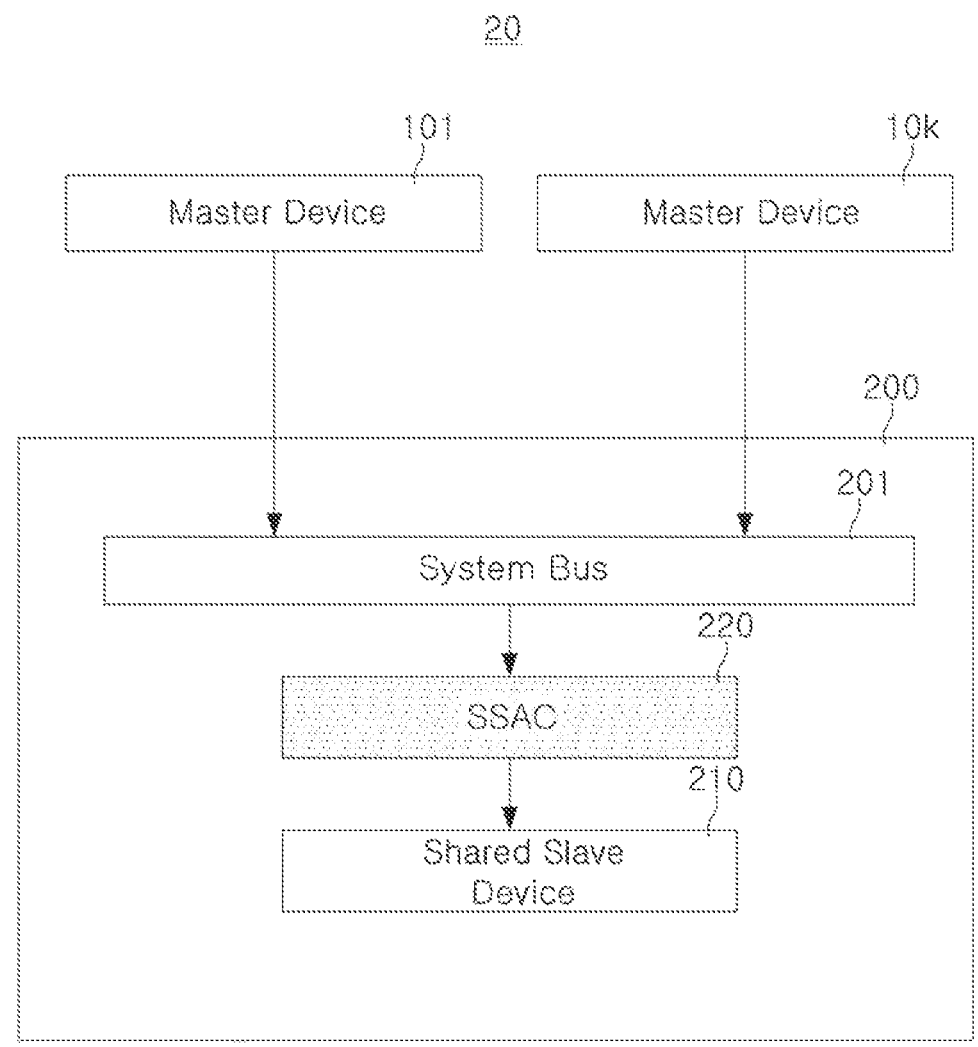
FIG. 2 is a diagram illustrating an electronic device 20 according to an example embodiment.

FIG. 2 is a diagram illustrating an electronic device 20 according to an example embodiment. Referring to FIG. 2, the electronic device 20 may include a plurality of master devices 101, . . . , and 10k, where k is an integer greater than or equal to 2, and a shared subsystem 200. The shared subsystem 200 may include a system bus 201, a shared slave device 210, and a shared slave access controller (SSAC) 220 connected to the system bus 201.

The system bus 201 may include the Advanced extensible Interface (AXI) bus. AXI is a high-performance, high-bandwidth, low-latency system bus that may be part of the Advanced Microcontroller Bus Architecture (AMBA). AXI provides multiplexed interconnections that can perform multiple transactions simultaneously within a single clock cycle, and it has separate read/write channels to increase communication parallelism. AXI includes an address/control channel, a read data channel, a read response channel, a write data channel, and a write response channel.

The shared slave access controller 220 may be implemented to set or control access for all master devices 101, . . . , 10k accessing the shared slave device 210. The shared slave access controller 220 may simultaneously reset access settings for master devices on a time axis and control access based on the access characteristics of each master device.

The electronic device 20 according to an example embodiment is equipped with the shared slave access controller 220 that comprehensively monitors and controls access to the shared slave device 210, thereby preventing interference from other subsystems in complex scenarios and allowing flexible utilization of the shared slave device 210. Consequently, the electronic device 20 may quickly identify a cause of unintended effects and malfunctions, even during debugging of the shared slave device 210.

Figure 3A:
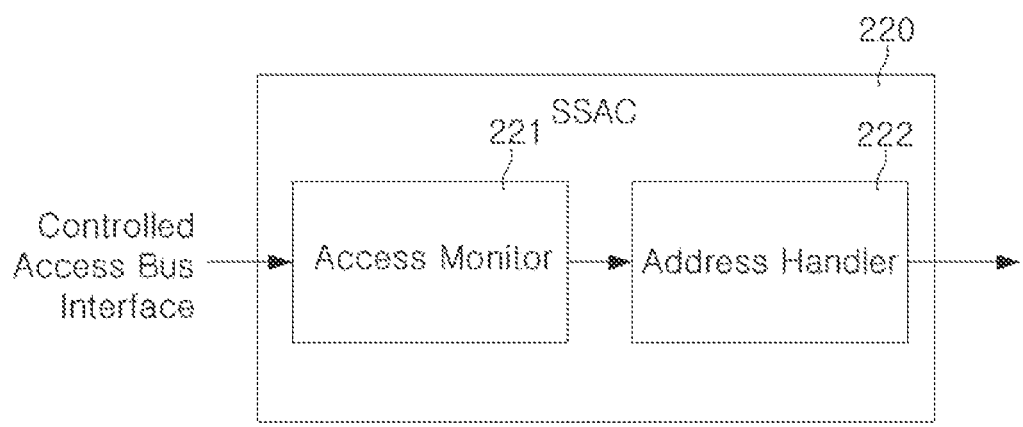
FIGS. 3A and 3B are diagrams illustrating a shared slave access controller according to an example embodiment.

FIG. 3A is a diagram illustrating a shared slave access controller 220 according to an example embodiment. Referring to FIG. 3A, the shared slave access controller 220 may include an access monitor 221 and an address handler 222.

The access monitor 221 receives an access request from one of the plurality of master devices 101, . . . , and 10k, and may be implemented to check whether valid access has been detected in the access request. For example, the access monitor 221 may determine whether the access request is valid.

In an example embodiment, the access monitor 221 monitors access requests, and when there is an access request, the access master may be identified through an access identification (ID) number. The access ID may include a physical port number of a master device connected to the system bus 201. This physical port number may be automatically added with respect to a master device's access request, in the system bus 201. For example, a port number of '00' may be added for the first master device 101 and a port number of '01' may be added for the second master device 102. The access monitor 221 may check whether the identified access master has authority (read or write) for the address area of the access request.

In an example embodiment, the access monitor 221 may perform an operation of determining an access master as follows. The access monitor 221 ANDs masking bits (P_ID_MASK) with respect to an access ID (Master access ID), and then, may perform an XOR operation on a checking bit (P_CHECK_ID) capable of identifying each master. The checking logic may be implemented as corresponding access master ID_FLAG=!((Master access ID & P_ID_MASK) ^P_CHECK_ID). In an example embodiment, the access monitor 221 may include a first logic for performing an AND operation on an identification number of an access request and masking bits, and a second logic for performing an XOR operation on the result value of the first logic and the checking bit to distinguish the master.

The address handler 222 may be implemented to pass the access request to the shared slave device 210 by allowing the access request according to the valid access setting. Also, the address handler 222 may be implemented to transmit a response to the rejection of the access request to a corresponding master device. To this end, the bus interface signal may be adjusted.

In an example embodiment, the address handler 222 may output the address of the access request to the shared slave device 210 without modification when there is an access right. On the other hand, if there is no access right, the address handler 222 may output a predefined address in place of the address of the access request to the shared slave device 210. The predefined address may be different than the input address.

As illustrated in FIG. 3A, the function of the shared slave access controller 220 may be implemented in a fixed structure. On the other hand, the functions of the shared slave access controller according to an example embodiment need not be limited to being fixed. The shared slave access controller according to an example embodiment may perform software access control through register setting.

Figure 3B:
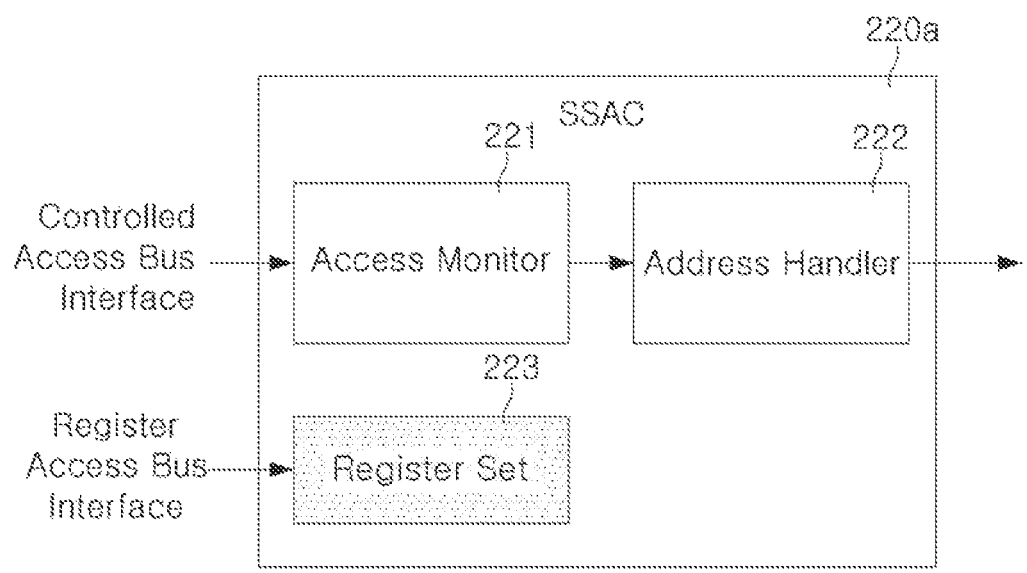

FIG. 3B is a diagram illustrating a shared slave access controller 220a according to another example embodiment. Referring to FIG. 3B, the shared slave access controller 220a may further include a register set 223, as compared to the shared slave access controller 200 illustrated in FIG. 3A.

The register set 223 may store register setting values for setting functions of the shared slave access controller 220a. In an example embodiment, register setting values may include values for setting access for each master, with respect to the shared slave device 210. In an example embodiment, the register setting values may include values indicating access rights for a plurality of respective access windows of the shared slave device 210.

Figure 4:
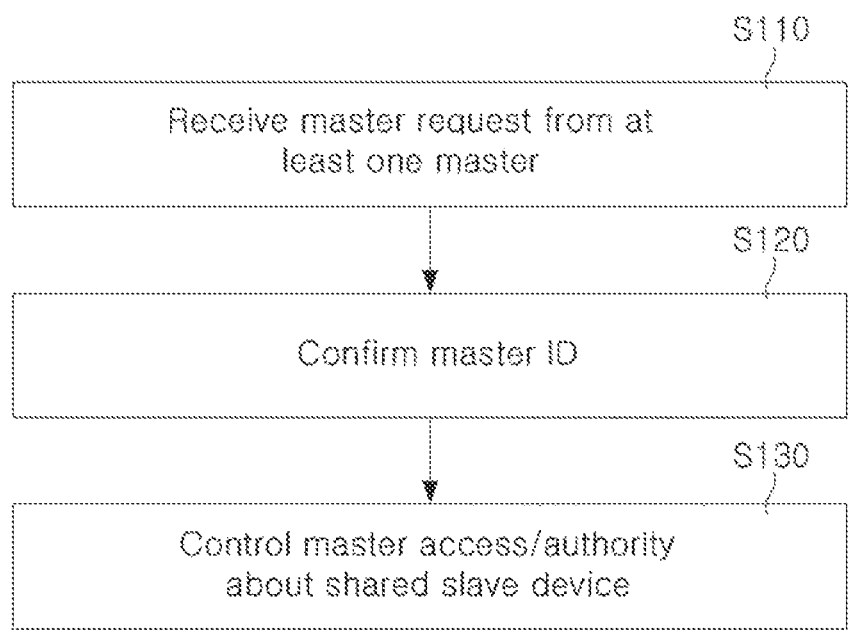
FIG. 4 is a flowchart illustrating a method of operating a shared subsystem 200 according to an example embodiment.

FIG. 4 is a flowchart illustrating a method of operating a shared subsystem 200 according to an example embodiment. Referring to FIG. 4, the shared subsystem 200 may operate as follows.

The shared subsystem 200 may receive a master request for the shared slave device 210 from at least one master device (S110). The shared subsystem 200 may check the master identification number (ID) according to the master request (S120). The shared subsystem 200 may control master access/authority for the shared slave device according to the master ID (S130).

In an example embodiment, master access to the shared slave device 210 may be set. In an example embodiment, the shared slave device 210 may include a plurality of access windows. In an example embodiment, a master authority for each of a plurality of access windows may be set. In an example embodiment, master access or master authority is determined according to the master request, and when master access or master authority is permitted as a result of the determination, the master request passed to the shared slave device 210. In an example embodiment, when master access or master authority is not allowed, the master request is stopped, and an interruption notification may be sent to at least one master device.

Example embodiments may be applied to an electronic device having a plurality of masters sharing a memory device.

Figure 5A:
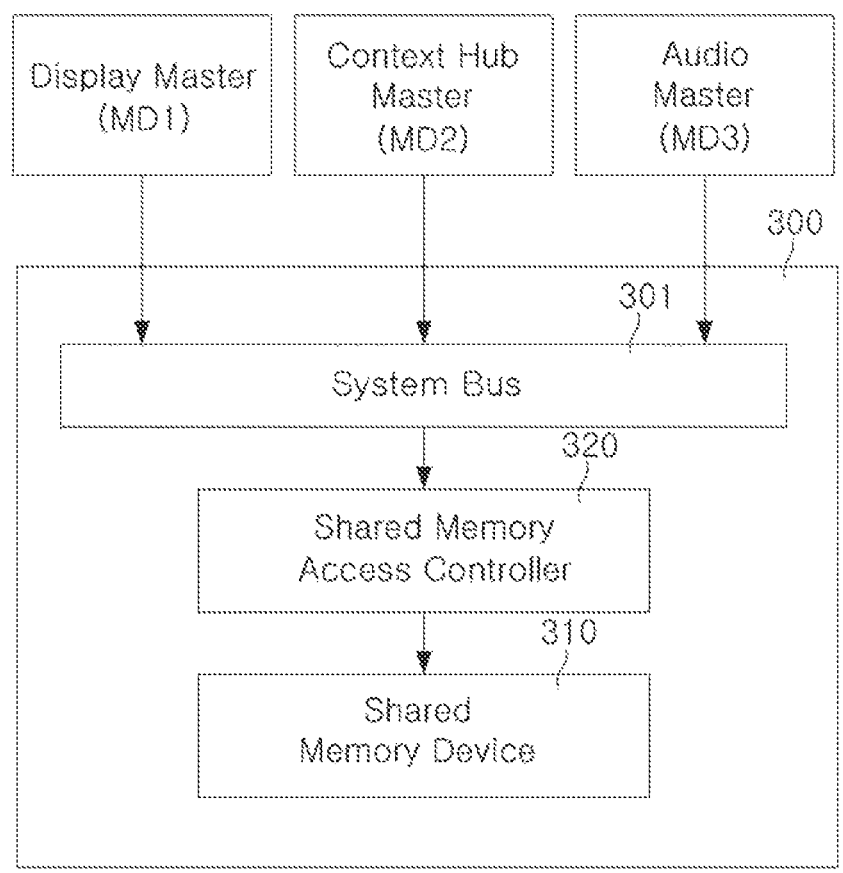
FIG. 5A is a view illustrating an electronic device according to another example embodiment.

FIG. 5A is a diagram illustrating an electronic device 30 according to another example embodiment. Referring to FIG. 5A, the electronic device 30 may include a plurality of master devices MD1, MD2, and MD3 and a shared memory system 300.

The first master device MD1 may be a display master device. The second master device MD2 may be a context hub master device. The third master device MD3 may be an audio master device.

The shared memory system 300 may include a system bus 301, a shared memory device 310, and a shared memory access controller 320. As described with reference to FIGS. 2 to 4, the shared memory access controller 320 may be implemented to set and control the master's access range/authority for the shared memory device 310.

Figure 5B:
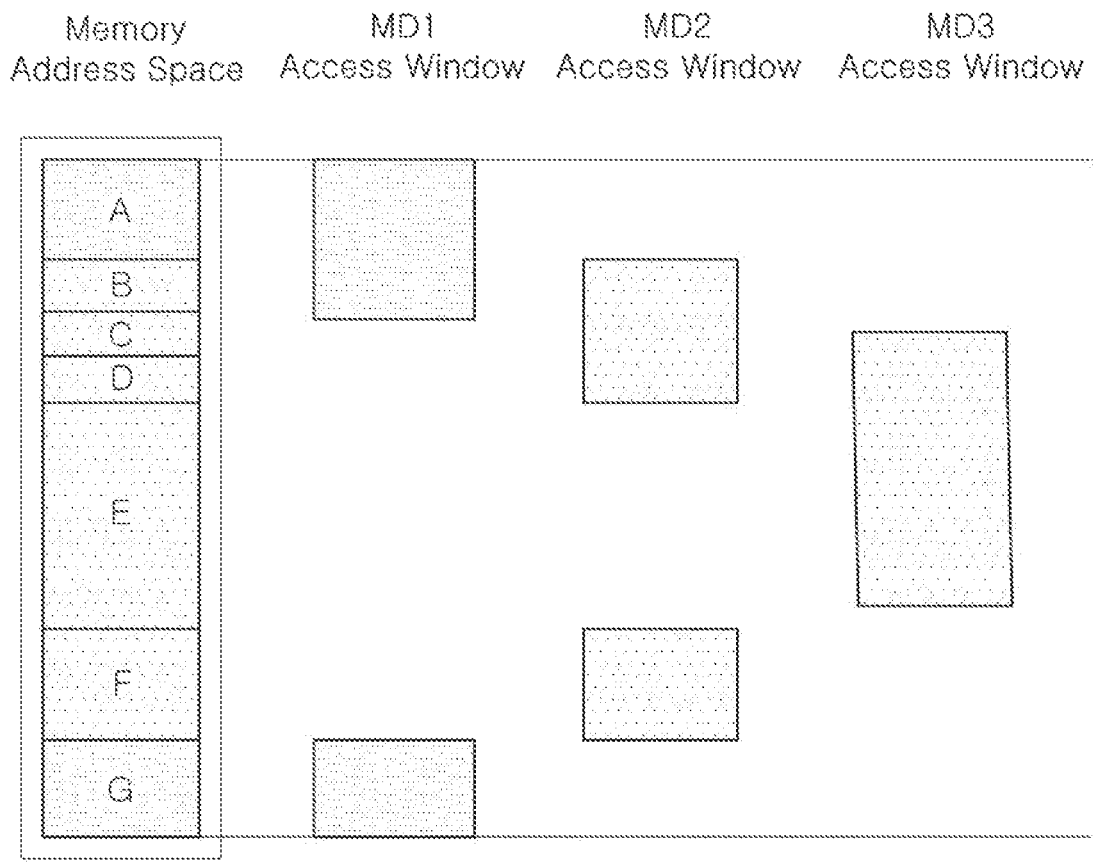
FIG. 5B is a view illustrating a master access window of a shared memory device of an electronic device.

FIG. 5B is a diagram illustrating a master access window of the shared memory device 310 according to an example embodiment. Referring to FIG. 5B, resources of the shared memory device 310 may be divided into a plurality of memory address spaces A to G. The first master access window may include memory address spaces A, B, and G. The second master access window may include memory address spaces B, C, D, and F. The third master access window may include memory address spaces D and E. In an example embodiment, the master access windows may respectively share some memory address space.

On the other hand, example embodiments relate to a plurality of shared slave devices.

Figure 6A:
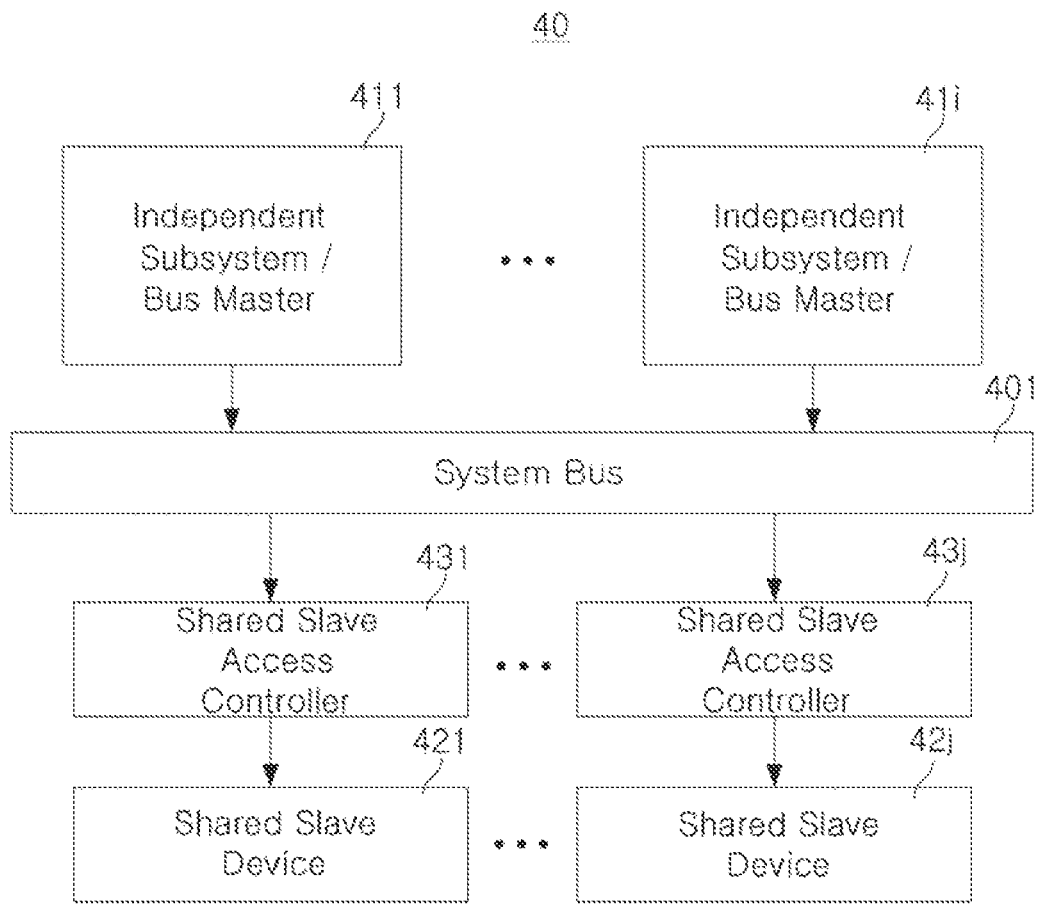
FIGS. 6A and 6B are diagrams illustrating electronic devices having a plurality of shared slave devices according to example embodiments.
Figure 6B:
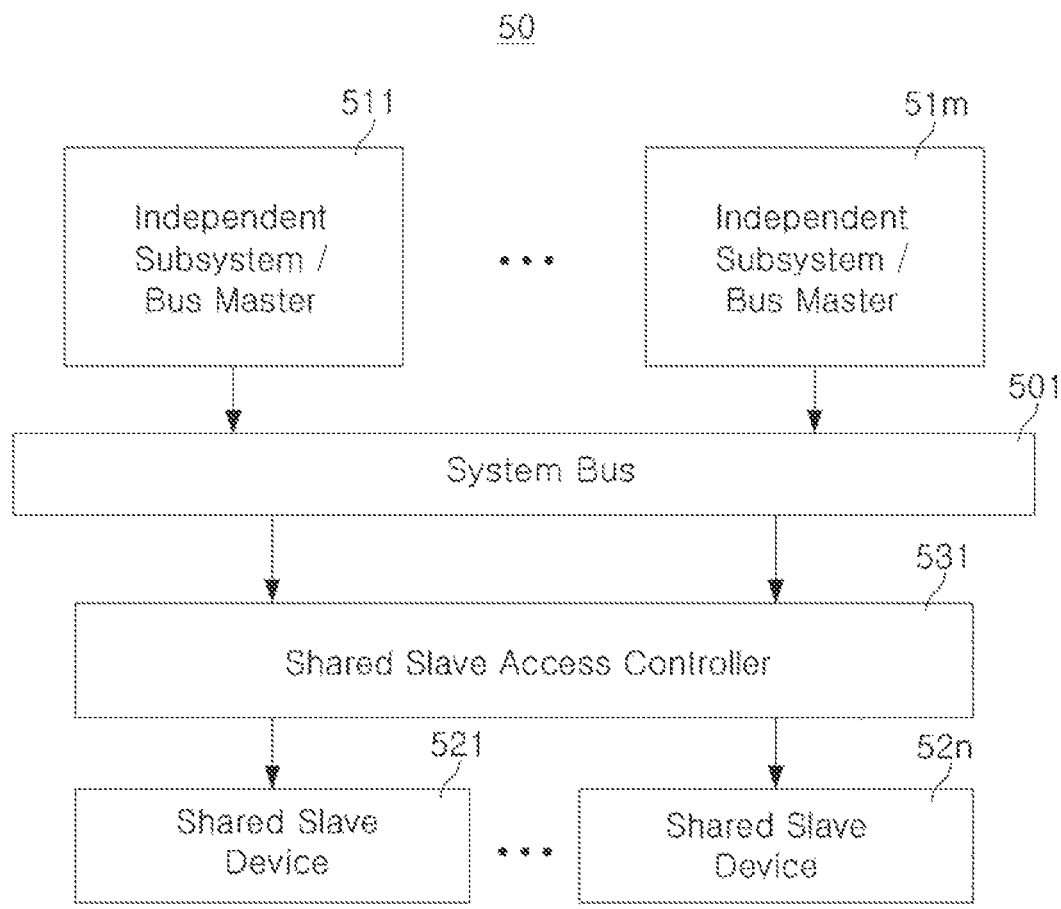

FIGS. 6A and 6B are diagrams illustrating electronic devices having a plurality of shared slave devices according to an example embodiment.

Referring to FIG. 6A, an electronic device 40 may include a system bus 401, a plurality of master devices 411, ..., and 41i, where i is an integer greater than or equal to 2, a plurality of shared slave devices 421, ..., and 42j, where j is an integer greater than or equal to 2, and shared slave access controllers 431, ..., and 43j corresponding to the slave devices, respectively. The plurality of master devices 411, ..., and 41i may be respectively implemented as an independent subsystem or bus master.

As illustrated in FIG. 6A, to control access to the respective shared slave devices 421, ..., and 42j, the shared slave access controllers 431, ..., and 43j may perform individual access control. For example, the respective shared slave access controllers 431, ..., and 43j may set the access window and authority of the corresponding shared slave device.

Referring to FIG. 6B, an electronic device 50 may include a system bus 501, a plurality of master devices 511, ..., and 51m, where m is an integer of 2 or more, a plurality of shared slave devices 521, ..., and 52n, where n is an integer greater than or equal to 2, and one slave access controller 531 controlling the slave devices. As illustrated in FIG. 6B, a plurality of shared slave devices 521, ..., and 52n may be controlled by an integrated shared slave access controller 531. The shared slave access controller 531 may set an integrated/shared access window and authority for the shared slave devices 521, ..., and 52n.

According to example embodiments, the shared slave access controller may be implemented to differently set access rights for each master.

FIGS. 7A and 7B are drawings illustrating that access rights are differently assigned to the access windows AW0 to AW7 for the plurality of respective masters (0 to 5), according to example embodiments.

Referring to FIG. 7A, write permission of masters may be granted according to the access windows AW0 to AW7. Write permission of the first master Master0 may be granted to the access window AW0. Write permission of the first master Master0 and the third master Master2 may be granted to the access window AW1. Write permission of the first to fourth masters Master0 to Master3 may be granted to the access window AW3. Write permission of the second master Master1 and the third master Master2 may be granted to the access window AW4. The write permission of the third master Master2 may be granted to the access window AW4. Write permission of any master may not be granted to the access windows AW5, AW6 and AW7.

Referring to FIG. 7B, read permission of masters granted according to the access windows AW0 to AW8 are illustrated as an example. Read authority for the fifth master Master4 and the sixth master Master5 may be granted to the access window AW0. Read rights of the first to fifth masters (Master0 to Master4) may be granted to the access window AW1. Read rights of the first to fourth masters (Master0 to Master3) may be granted to the access window AW2. The read permission of the third master Master2 may be granted to the access window AW3. Read rights of the second to fifth masters Master1 to Master4 may be granted to the access window AW4. With respect to the access windows AW5, AW6 and AW7, read permission may not be granted to any master.

On the other hand, example embodiments relate to different subsystems.

Figure 8:
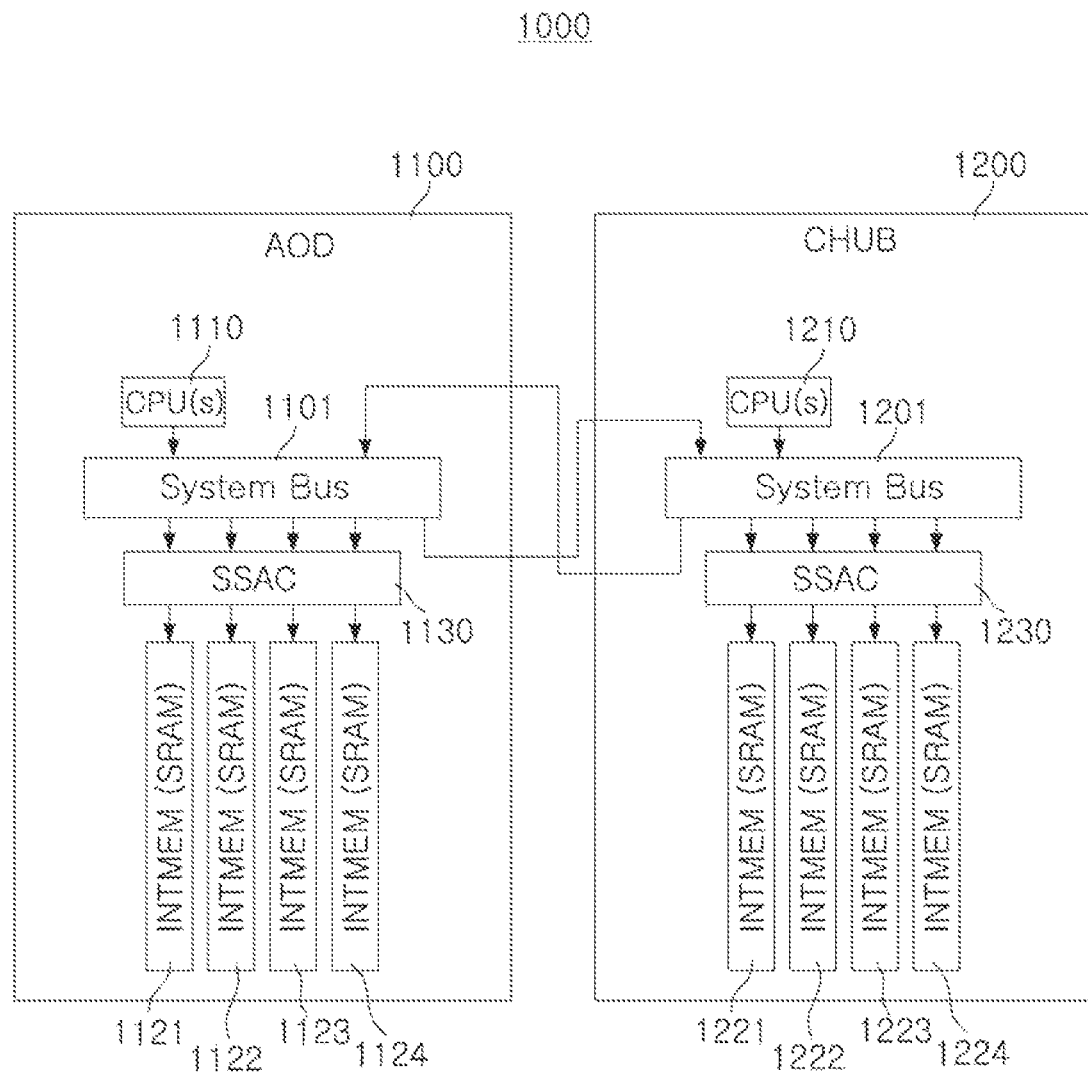
FIG. 8 is a diagram illustrating an electronic device 1000 according to an example embodiment.

FIG. 8 is a diagram illustrating an electronic device 1000 according to an example embodiment. Referring to FIG. 8, the electronic device 1000 may include an Always on Display (AOD) subsystem 1100 and a Context Hub (CHUB) subsystem 1200.

The AOD subsystem 1100 may include a system bus 1101, at least one processor 1110, a plurality of internal memory devices 1121 to 1124, and a shared slave access window controller (SSAC) 1130. The shared slave access window controller (SSAC) 1130 may be implemented to set and control the master's access range/authority for each of the internal memory devices 1121 to 1124 as described with reference to FIGS. 2 to 7B.

The CHUB subsystem 1200 may include a system bus 1201, at least one processor 1210, a plurality of internal memory devices 1221 to 1224, and a shared slave access window controller (SSAC) 1230. The shared slave access window controller (SSAC) 1230 may be implemented to set and control the master's access range/authority for each of the internal memory devices 1221 to 1224 as described with reference to FIGS. 2 to 7B.

In an example embodiment, the system bus 1101 of the AOD subsystem 1100 may be implemented to communicate with the system bus 1201 of the CHUB subsystem 1200.

Referring back to FIG. 8, the electronic device 1000 may share an internal SRAM located in the AOD/CHUB subsystem of the AOD subsystem 1100 and CHUB subsystem 1200. The shared slave access window of each subsystem defines access windows (access areas where upper and lower addresses are defined) of SRAM, which are shared resources, and may set read and write privileges for each access window for the master in each AOD and CHUB subsystem.

Example embodiments are not limited thereto, and the unified setting to one SSAC for the separated SRAMs may be applied.

Figure 9:
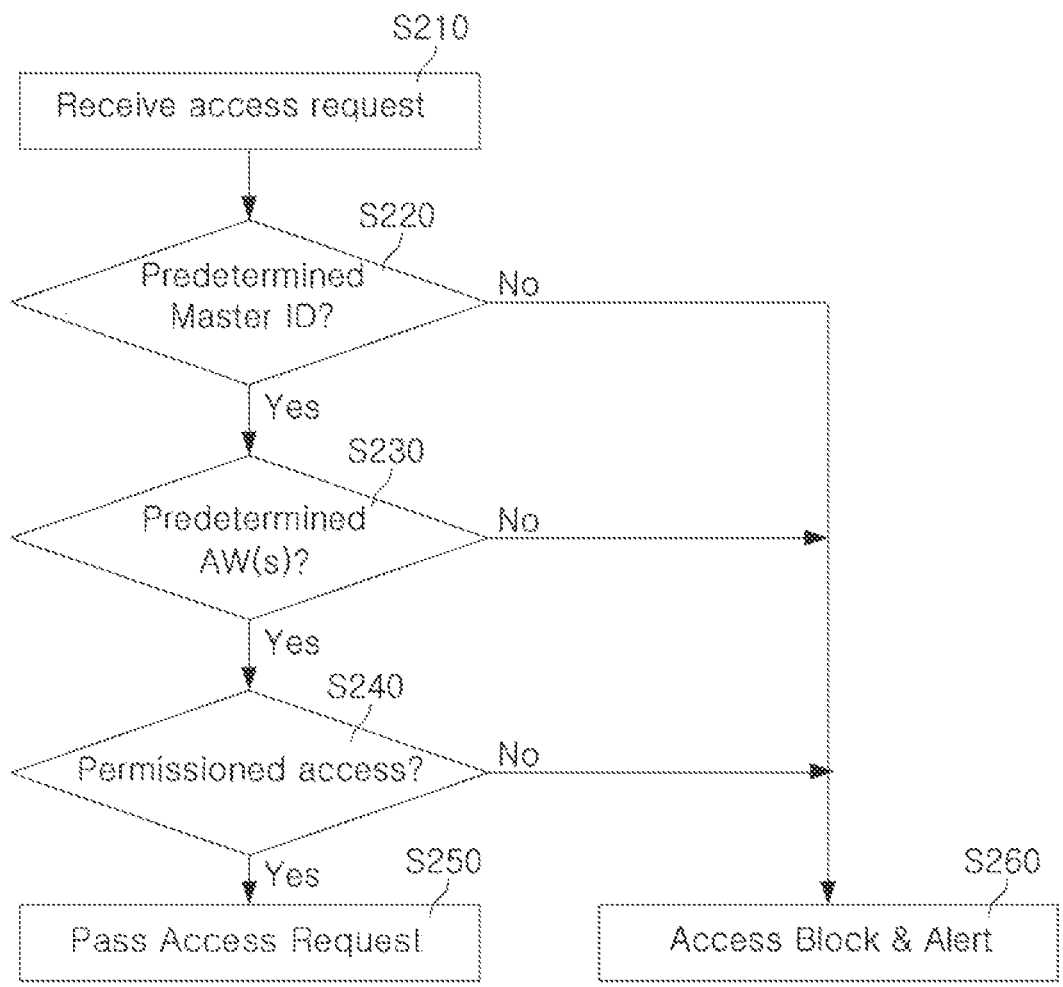
FIG. 9 is a flowchart illustrating a method of operating an electronic device according to an example embodiment.

FIG. 9 is a flowchart illustrating a method of operating an electronic device according to an example embodiment. Referring to FIGS. 2 to 9, an electronic device according to an example embodiment may access a shared slave device as follows.

The shared slave access controller (SSAC) may receive an access request from one master device (S210). The shared slave access controller (SSAC) may determine whether the master ID of the master device transmitting the access request exists (S220) is present in the access request. For example, the determination may include determining whether a predetermined master ID is present in the access request. If the master ID is present, the shared slave access controller (SSAC) may determine whether an access window corresponding to the access request is present (S230). If there is an access window corresponding to the access request, the shared slave access controller (SSAC) may determine whether the access authority of the master device for the corresponding access window is allowed (S240). If the access authority of the master device is allowed for the corresponding access window, the shared slave access controller (SSAC) may pass the access request to the shared slave device (S250).

On the other hand, if the master ID is not present, or if the access window corresponding to the access request does not exist, or if the access authority of the master device is not allowed for the corresponding access window, the shared slave access controller (SSAC) may block the access request and notify the master device transmitting the access request (S260) that the access request is blocked.

In an example embodiment, the identification number of the access request may correspond to the port number of the master device connected to the system bus. In an example embodiment, determining whether the access request is present is a predetermined master identification number may include AND operation of masking bits for the identification number of the access request, and XOR operation of the checking bit that identifies the master to the ID number operated by AND operation. In an example embodiment, access windows of the shared slave device and master authority for each of the access windows may be further set.

On the other hand, may be applied to a neural network computing device.

Figure 10:
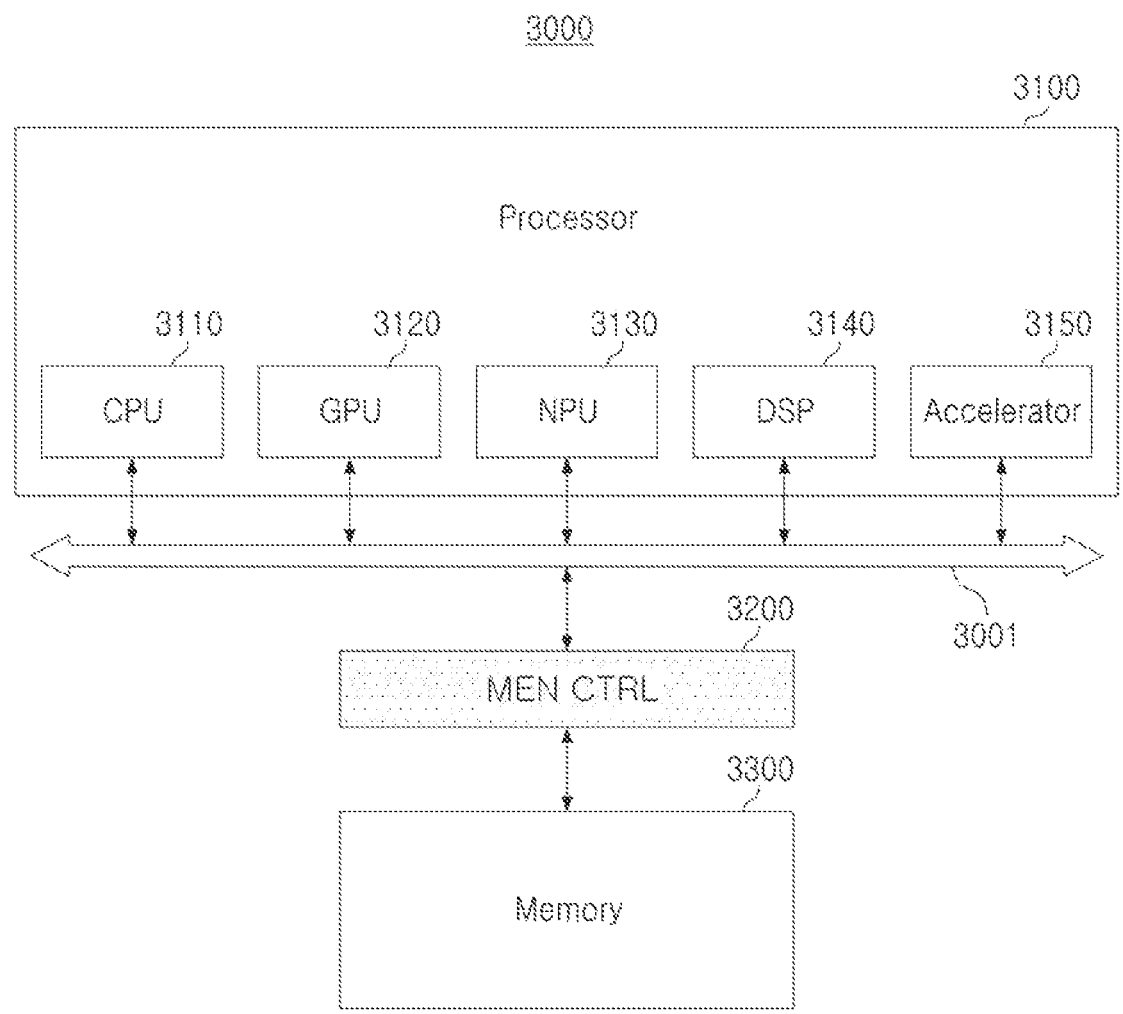
FIG. 10 is a diagram illustrating a neural network computing device according to an example embodiment.

FIG. 10 is a diagram illustrating a neural network computing device 3000 according to an example embodiment. Referring to FIG. 10, the neural network computing device 3000 may execute a neural network model. The neural network model models the learning method in which the human brain processes information, and may refer to a model that may accurately recognize and discriminate objects or specific information in various user data such as voice, image, video, and the like.

The neural network operation device 3000 may be a mobile system such as a mobile phone, a smartphone, a tablet personal computer (PC), a wearable device, a healthcare device, or an Internet of Things (IoT) device. However, the neural network computing device 3000 is not necessarily limited to mobile systems, and may be a personal computer, a laptop computer, a server, a media player, an automotive device such as a navigation device, or the like.

The neural network operation device 3000 may include a system bus 3001, a processor 3100, a memory controller 3200, and a memory device 3300. The system bus 3001 may support communication between the processor 3100, the memory controller 3200, and the memory device 3300.

The processor 3100 may perform a neural network operation using data stored in the memory device 3300. For example, neural network operation reads data and weights for each node included in the neural network model, performs a convolution operation of data and weights, and may include an operation of storing or outputting an operation result. Also, the processor 3100 may include a Central Processing Unit (CPU) 3110, a Graphics Processing Unit (GPU) 3120, a Neural Processing Unit (NPU) 3130, a Digital Signal Processor (DSP) 3140, an accelerator 3150, and a Power Management Unit (PMU) 3160.

The CPU 3110 may be implemented as a highly versatile computing device. The GPU 3120 may be implemented as a computing device optimized for parallel computation such as graphic processing. The NPU 3130 may be implemented as a computational device optimized for neural network computation. The NPU 3130 may include logic blocks for executing unit operations mainly used in neural network operations, such as convolution operations. The DSP 3140 may be implemented as a computing device optimized for real-time digital processing of analog signals. The accelerator 3150 may be implemented as a computing device for quickly performing a specific function. When the processor 3100 executes the neural network model, various hardware devices may operate together. For example, to execute a neural network model, not only the NPU 3130 but also heterogeneous computing devices such as the CPU 3110 and the GPU 3120 operate together, or the memory controller 3200 and the data bus 3001 may operate to read input data of the neural network model and store output data.

The neural network computing device 3000 may include a hardware layer, a system software layer, and an application layer. The hardware layer is a lowest layer of the neural network computing device 3000, and may include hardware devices such as a system bus, a processor, and a memory controller. The processor may include heterogeneous computing units, such as CPUs, GPUs, NPUs, DSPs, and other accelerators. The system software layer may manage the hardware devices of the hardware layer, and provide an abstracted platform. For example, the system software layer may run a Linux-like kernel. The system software layer may include dynamic voltage and frequency scaling (DVFS) and a neural network model executor. DVFS may determine operating frequencies of hardware devices for each memory layer using microarchitectural information. The neural network model executor may execute the neural network model using hardware devices operating at an operating frequency determined by DVFS. In addition, the neural network model executor may output the actual execution time of the neural network model as a result of executing the neural network model. Also, the system software layer may be driven by a processor. For example, the system software layer may be driven by a CPU. However, it should be understood that the computing device by which the system software layer may run is not limited to the CPU. The application layer may be executed on the system software layer, and may include multiple neural network models and other applications. For example, other applications may include a camera application.

The memory controller 3200 may be implemented to store data received from the processor 3100 in the memory device 3300 or to output data stored in the memory device 3300 to the processor 3100. In detail, the memory controller 3200 may be implemented to control the master access range and settings for the memory device 3300 as described with reference to FIGS. 2 to 9.

The memory device 3300 may be implemented to store data necessary for the processor 3100 to perform a neural network operation. For example, one or more neural network models that may be executed by the processor 3100 may be loaded into the memory device 3300. Also, the memory device 3300 may store input data and output data of the neural network model. The memory device 3300 may include a volatile memory such as a dynamic random access memory (DRAM), a synchronous DRAM (SDRAM), a static RAM (SRAM), a resistive RAM (RRAM), and the like, and may also include a non-volatile memory such as a flash memory.

The device described above may be implemented as a hardware component, a software component, and/or combinations of a hardware component and a software component. For example, the devices and components described herein may be implemented using one or more general purpose or special purpose computers, such as a processor, a controller, an arithmetic logic unit (ALU), a digital signal processor, a microcomputer, a field programmable gate array (FPGA), a programmable logic unit (PLU), a microprocessor, or any other devices that may execute and respond to instructions. The processing device may run an operating system and one or more software applications running on the operating system. The processing device may also access, store, manipulate, process, and generate data in response to execution of software. For convenience of understanding, there are cases in which one processing device is used, but those skilled in the art will understand that the processing device may include a plurality of processing elements or a plurality of types of processing elements. For example, a processing device may include a plurality of processors or one processor, and one controller. Also, other processing configurations such as parallel processors may be used.

Software may include a computer program, code, instructions, or a combination of one or more thereof, and may configure the processing devices to operate as required or may command the processing devices independently or collectively. Software or data may be embodied in any tangible machine, component, physical device, virtual equipment, computer storage medium or device, to be interpreted by a processing device or to provide instructions or data to a processing device. Software may be distributed on networked computer systems and stored or executed in a distributed manner. Software and data may be stored on one or more computer readable media.

The slave controller according to an example embodiment may be connected to a shared slave and set and control access. The slave controller may distinguish access masters through access IDs. Additionally, the slave controller may set access windows for the entire access range of the shared slave. Furthermore, the slave controller may map the access permissions of each access master for each access window. Here, the access window may grant permissions separately for read and write operations. When access is allowed, the slave controller may output the input address without modification, but when access is denied, it may output a predefined address which is different than the input address.

The shared slave access controller according to an embodiment includes a configuration to control access to the shared slave device, distinguishes access masters through access IDs, and may map the access window's settings and access permissions for each access master. As set forth above, a shared slave access controller, an electronic device having the same, and an operating method thereof according to an example embodiment may actively control access to a shared device.

A shared slave access controller, an electronic device having the same, and an operating method thereof according to an example embodiment are advantageous for debugging in a centralized control method.

While aspects of example embodiments have been particularly shown and described, it will be understood that various changes in form and details may be made therein without departing from the spirit and scope of the following claims.

What is claimed is:

1. An electronic device comprising:
    a plurality of master devices; and
    a shared subsystem comprising:
        a system bus connected to the plurality of master devices;
        a shared slave device; and
        a shared slave access controller connected to the system bus, and configured to determine a master identification number corresponding to an access request received from a first master device of the plurality of master devices, determine whether or not to permit the first master device to access the shared slave device during an access window of the shared slave device based on the master identification number, and control access authority of the first master device during the access window.

2. The electronic device of claim 1, wherein the master identification number indicates a port number.

3. The electronic device of claim 1, wherein the shared slave access controller comprises:
    an access monitor circuit configured to determine whether to permit access to the shared slave device according to the master identification number; and
    an address handler configured to determine the access authority of the first master device during the access window using an address of the access request based on access being permitted, and output the access request to the shared slave device based on the access authority being permitted.

4. The electronic device of claim 3, wherein the shared slave access controller further comprises a register set storing at least one setting value related to the access window or the access authority.

5. The electronic device of claim 1, wherein the shared slave device comprises a memory device having a plurality of access windows.

6. The electronic device of claim 5, wherein at least one of the plurality of access windows is allocated to at least two of the plurality of master devices.

7. The electronic device of claim 5, wherein the shared slave access controller is further configured to set a write permission or a read permission of at least one of the plurality of master devices differently in at least one of the plurality of access windows.

8. The electronic device of claim 1, wherein the shared slave access controller is further configured to determine whether the access window corresponding to the access request is a predetermined access window, determine whether to permit the access request based on the access window being the predetermined access window, and pass the access request to the shared slave device based on determining to permit the access request.

9. The electronic device of claim 8, wherein the shared slave access controller is further configure to block the access request and output a blocking notification to the first master device, based on the master identification number not being a predetermined master identification number, the access window not being the predetermined access window, or determining to not permit the access request.

10. The electronic device of claim 1, wherein the shared slave device comprises a synchronous random access memory (SRAM),
    wherein one of the plurality of master devices is a context hub (CHUB) chip, and
    wherein the shared subsystem is an Always on Display (AOD) chip.

11. An electronic device comprising:
    a plurality of master devices;
    a system bus connected to the plurality of master devices;
    a shared slave access controller connected to the system bus; and
    a plurality of shared slave devices connected to the shared slave access controller,
    wherein the shared slave access controller is configured to determine a master identification number corresponding to an access request received from a first master device of the plurality of master devices, determine whether to permit the first master device to access a first shared slave device of the plurality of shared slave devices during an access window of the first shared slave device based on the master identification number, and control an access authority of the first master device during the access window.

12. The electronic device of claim 11, wherein the shared slave access controller comprises a plurality of shared slave access controllers corresponding to the plurality of shared slave devices, respectively.

13. The electronic device of claim 11, wherein the shared slave access controller comprises:
    an access monitor circuit configured to determine whether to permit access by the shared slave access controller according to the master identification number; and
    an address handler configured to determine the access authority of the first master device during for the first shared slave device during the access window using an address of the access request based on access being permitted, and output the access request to the first shared slave device based on the access authority being permitted.

14. The electronic device of claim 13, wherein the access monitor circuit is further configured to perform an AND operation on masking bits with respect to the master identification number, and then perform an XOR operation on checking bits distinguishing respective master devices, and determine whether to permit the first master device to access the first shared slave device based on the AND operation and the XOR operation.

15. The electronic device of claim 13, wherein the shared slave access controller further comprises a register set storing at least one setting value related to the access window or the access authority.

16. A method of operating a shared slave access controller, the method comprising:
    determining whether an identification number of an access request received from a master device is a predetermined master identification number;
    determining whether an access window corresponding to an address of the access request is a predetermined access window based on the identification number of the access request being the predetermined master identification number;

determining an authority for the master device during the access window based on the access window being the predetermined access window; and passing the access request to a shared slave device based on the authority for the access window of the master device being allowed.

17. The method of claim 16, wherein the identification number of the access request corresponds to a port number of the master device connected to a system bus.

18. The method of claim 16, wherein the determining whether the identification number is the predetermined master identification number comprises:

performing an AND operation on masking bits with respect to the identification number of the access request; and performing an XOR operation on a result of the AND operation and a checking bit identifying the master device.

19. The method of claim 16, further comprising setting access windows of the shared slave device and a master authority for each of the access windows.

20. The method of claim 16, further comprising notifying the master device based on the identification number of the access request not being the predetermined master identification number, the access window not being the predetermined access window, or the authority of the master device for the access window not being permitted.

* * * * *